April 21, 1959 — H. BERGER — 2,883,244
BEARING DEVICES
Filed June 2, 1954 — 6 Sheets-Sheet 1
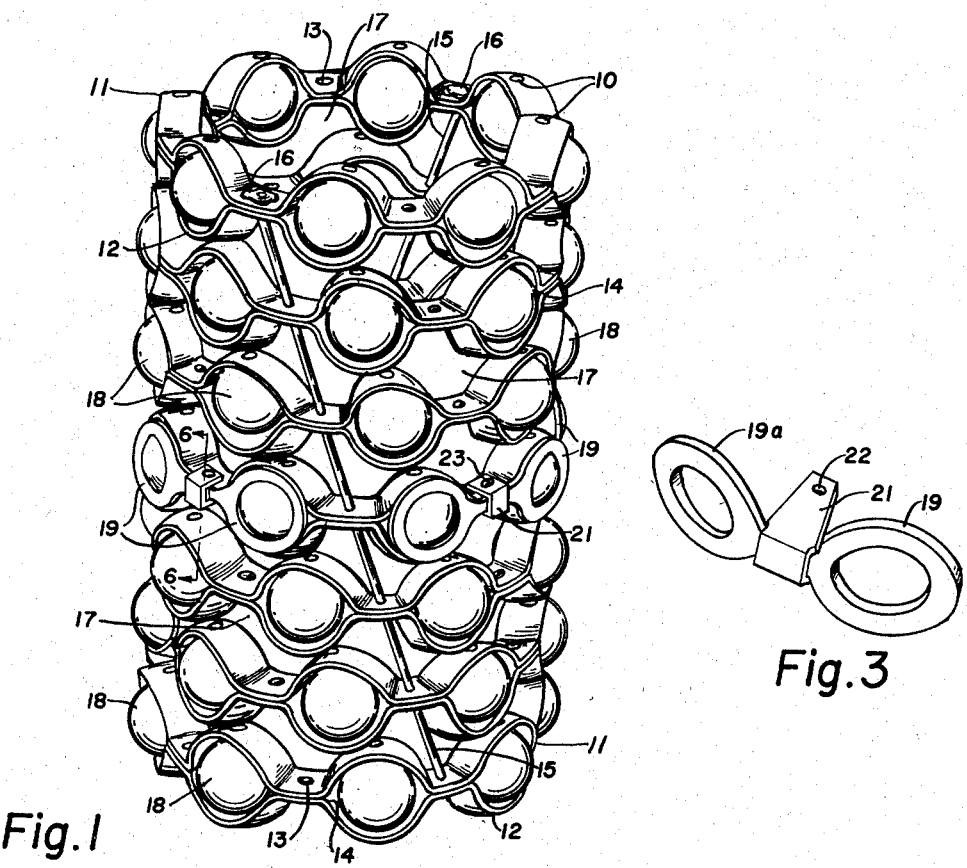
Fig. 1
Fig. 3
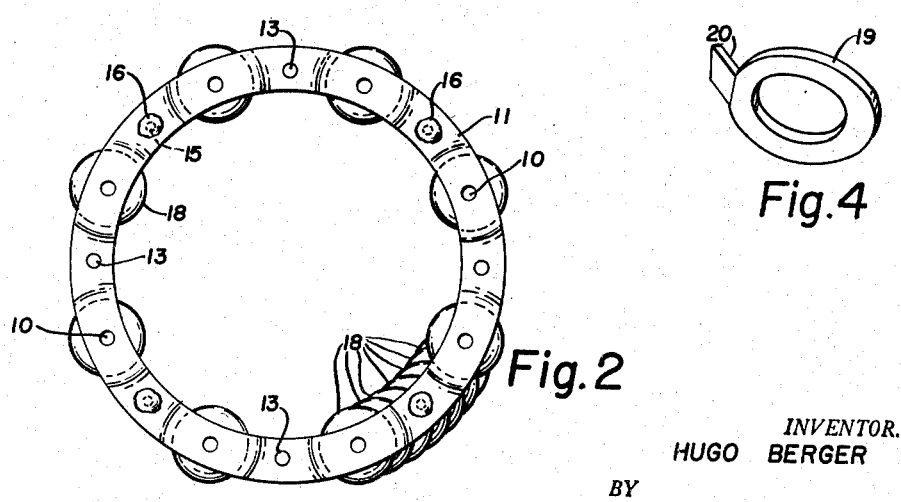
Fig. 2
Fig. 4
INVENTOR.
HUGO BERGER
BY
*Attorneys*

April 21, 1959  H. BERGER  2,883,244
BEARING DEVICES
Filed June 2, 1954  6 Sheets-Sheet 2

INVENTOR.
HUGO BERGER
BY

April 21, 1959  H. BERGER  2,883,244
BEARING DEVICES
Filed June 2, 1954  6 Sheets-Sheet 3

INVENTOR.
HUGO BERGER
BY

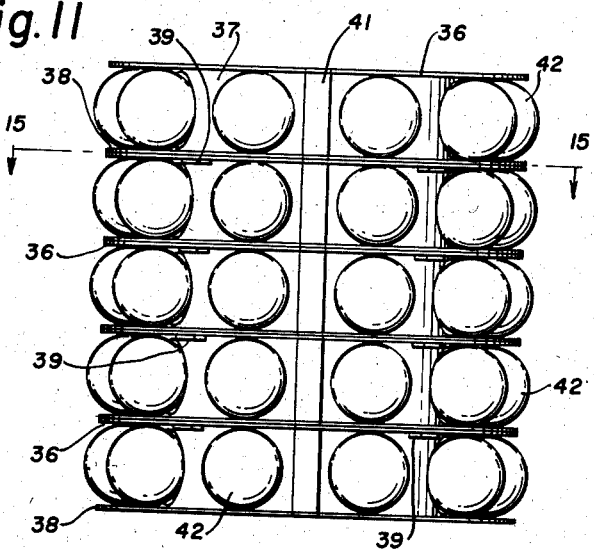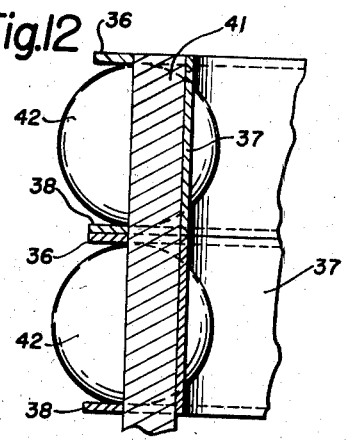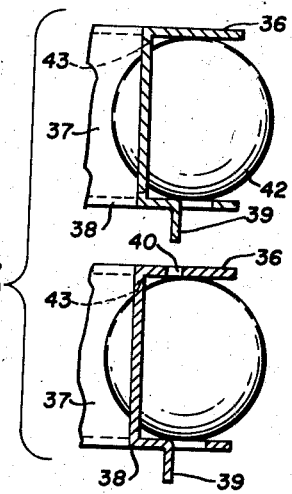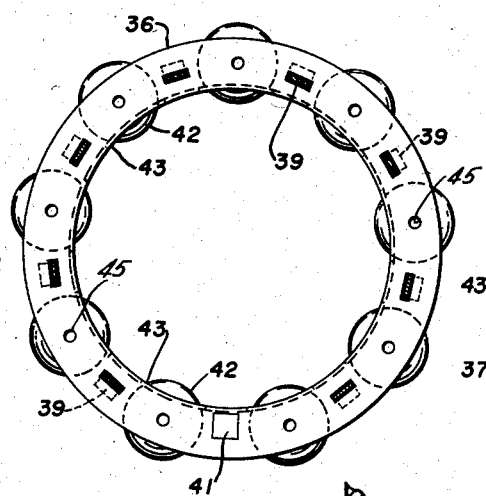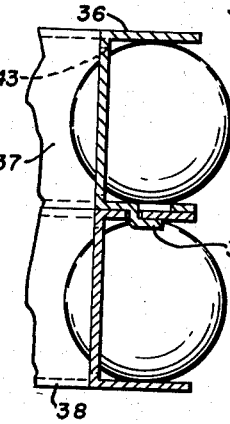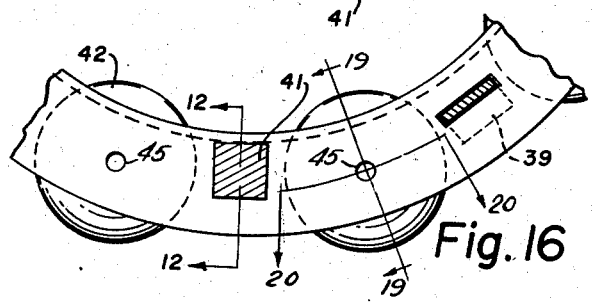

INVENTOR.
HUGO BERGER

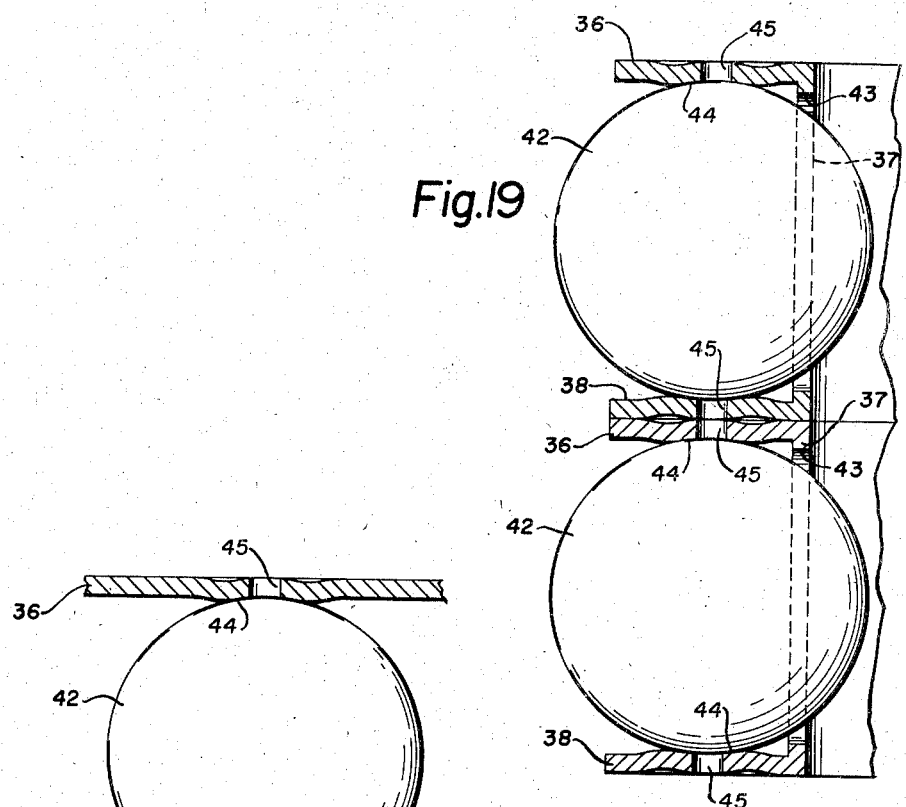
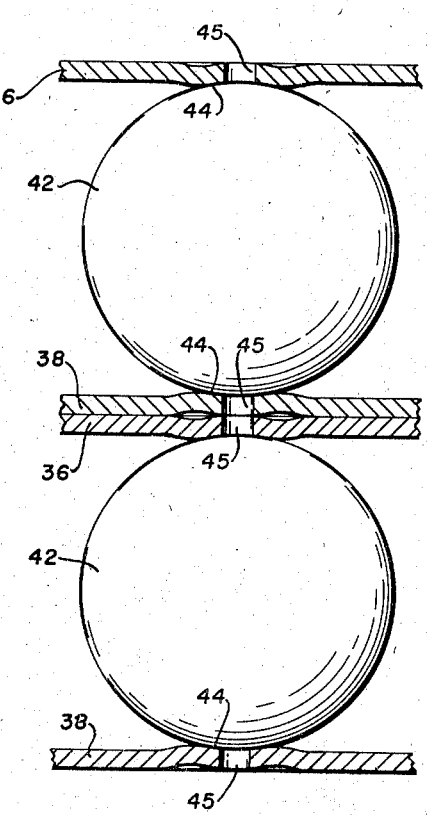

United States Patent Office 2,883,244
Patented Apr. 21, 1959

2,883,244

BEARING DEVICES

Hugo Berger, Remscheid-Hasten, Germany, assignor, by mesne assignments, to Elizabeth Alma Pauline Berger, also known as Lisa Berger, Cleveland, Ohio Application June 2, 1954, Serial No. 433,892

23 Claims. (Cl. 308—6)

My invention relates to bearing devices of the type utilizing ball bearings.

My invention is particularly directed to bearing devices in which ball bearings are arranged circumferentially of a shaft and also in an axial direction along the shaft.

An object of my invention is to provide an improved bearing device having ball bearings held in proper position both circumferentially and longitudinally in respect to a shaft and cylindrical bore in a housing.

Another object is the provision of a bearing device having ball bearings held in proper position both circumferentially and longitudinally of a shaft and in which provision is made for passage of lubricant through the device for the proper lubrication of the ball bearings.

Another object is the provision for an improved construction of a retainer for ball bearings arranged both circumferentially and longitudinally of a shaft.

Another object is the provision for the improved construction in the ball bearing retainer means of a device of this class.

Another object is the provision of improved means for mounting a ball bearing retaining member upon a shaft.

Another object is the provision of a mechanism for yieldably retaining a ball bearing holder upon a shaft and which permits the ready removal of the holder when desired.

Another object is the provision of a device so constructed as to provide improved results not heretofore obtainable and in a new and unique manner.

Other objects and a fuller understanding of my invention may be had by referring to the following description and claims, taken in conjunction with the accompanying drawings, in which:

Figure 1 is a perspective view of the preferred form of my bearing device removed from the shaft upon which it would usually be mounted;

Figure 2 is a plan view of the bearing device shown in Figure 1;

Figure 3 is an enlarged perspective view of the spring device utilized for resiliently pressing inward the intermediate course or circle of ball bearings;

Figure 4 is a perspective view of one of the pair of springs utilized in the arrangement shown in Figure 3;

Figure 11 is a side view of another modified form of my device;

Figure 12 is an enlarged sectional view showing detail of the construction of the modified form of device shown in Figure 11 and is a view taken through the line 12—12 of Figure 16;

Figure 13 is an enlarged sectional view showing detail of the means for connecting the portions of the device shown in Figure 11;

Figure 14 is another enlarged view similar to that of Figure 13 but showing in connected arrangement the parts which were shown as separate in Figure 13;

Figure 15 is a cross-sectional view of the device shown in Figure 11 and taken along the line 15—15 of Figure 11;

Figure 16 is an enlarged partial view of the showing of Figure 15;

Figure 19 is an enlarged sectional view taken through the line 19—19 of Figure 16; and Figure 20 is an enlarged sectional view taken through the line 20—20 of Figure 16.

Figure 5:
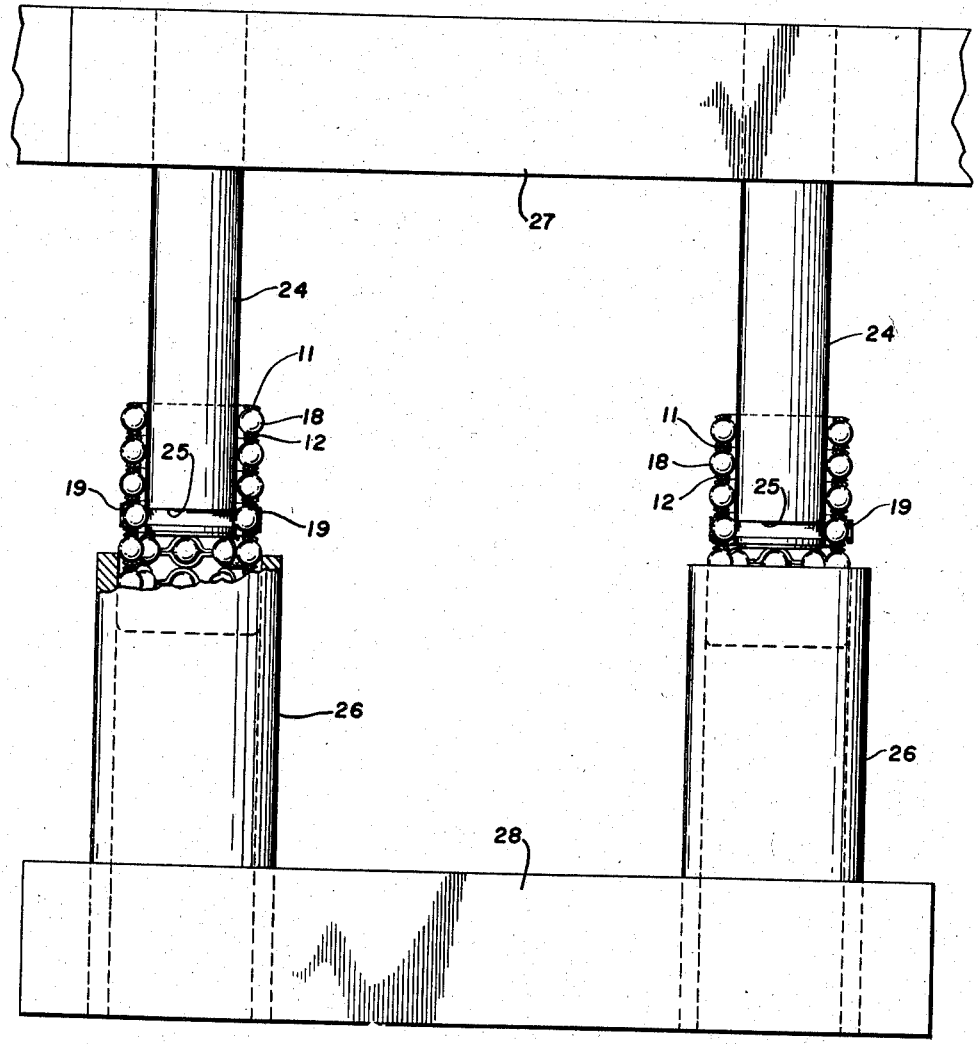
Figure 5 is a side view partially in section of a die set utilizing my invention and shows one application of the invented device.
Figure 6:
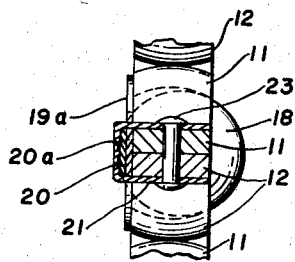
Figure 6 is an enlarged sectional view taken through the line 6—6 of Figure 1 and shows the inward resilient urging of one of the intermediate courses or circles of balls by the spring device shown in Figure 3.

The preferred form of my device is shown in Figure 1. This device comprises a plurality of ball separators or cage rings which retain ball bearings in proper position. In the particular form illustrated, there are seven cage rings or retainers which are stacked concentric with each other and interconnected to provide an open network as illustrated. This provides a cage for retaining ball bearings arranged in both circular form and along the length of the axial extent of the device. Thus, the device is of general cylindrical form and is adapted to fit within the cylindrical bore of a housing and around the cylindrical exterior of a shaft or pin.

Each of the circular retainers or cage rings is comprised of an upper half 11 and a lower half 12 which are riveted together by rivets 13. The members 11 and 12 are in a wavy or undulating form so that when interconnected by rivets 13 they provide ball rockets or recesses 14. The walls of each socket are concave so as to provide a partially spherical inner wall complementing the spherical surface of each ball. Thus, the form of the inner walls in each socket 14 is such as to retain a ball bearing 18 therein. Upon the members 11 and 12 of each cage ring being connected with the balls in position, the balls are held so that they may move to a small degree radially inward and radially outward, but may not be removed from the sockets. Thus, there is a loose sliding and rolling fit of each ball 18 within its respective socket 14. The play or fit of the ball in the socket is such that there is some limiting latitude in the radial inward and outward movement of each ball relative to the cage or retainer.

The seven cage rings or ball retainers are so mounted and interconnected as to have the sockets 14 and hence the balls 18 disposed along a line which is diagonal to a line parallel to the axis of the device. Thus, a line connecting the centers of the balls, one above the other, would not be parallel to the axis of the device but rather would be inclined at an angle thereto as shown in Figure 1.

To help secure the seven cage rings or ball retainers together and to hold them in the angled disposition shown in Figure 1, diagonal rods 15, of which there are four in number, run through aligned holes of the seven cage rings or retainers. The opposite ends of each rod 15 are secured by a brazing or soldering spot of material 16 to the retainers at the respective axial opposite ends of the device. Thus, the rods 15 provide rigidity to the open framework of the body of the device and help retain the sockets in the desired angular disposition relative to the axis of the device.

It is to be noted that there are a plurality of open spaces 17 intermediate the sockets 14. These open spaces 17 of the preferred form of device shown in Figure 1 extend between adjacent sockets of each retainer or cage ring and also between sockets of the next adjacent cage rings or retainers as illustrated in Figure 1.

These open spaces 17 are valuable in permitting the ready flow, passage and storage of lubricant, such as grease or like material, through and around the sockets of the device. This arrangement is to be distinguished from ball bearing retainers of a solid cylindrical sleeve, such as that shown, for example, in Figure 1 of U.S. Patent No. 2,422,774 issued to Guy O. Conner on June 24, 1947.

The device of Figure 1 also includes lubrication holes or apertures 10 which extend through the members 11 and 12 of the respective cage rings at the upper and lower vertex of the spherical convexity of each socket. The holes or apertures 10 provide passageways for lubricant from the open spaces 17 to the sockets of the cage rings. Thus, in Figure 1, lubricant may move upwardly or downwardly through the body of the device in and out of the sockets through the holes 10 bored or provided in the walls of the respective sockets.

It is thus seen that my device is well adapted for proper lubrication of the balls in the sockets in that lubricant may be stored in the open spaces 17 and also may move from the open spaces 17 around the edges of members 11 and 12 to an adjoining socket and also lubricant may readily enter directly the inner convexity of a socket through its wall by way of the holes 10. The holes 10 of the sockets extend in a direction parallel to the axis of the device so that the lubricant may freely flow through the holes 10 into the sockets upon axial movement of the device.

Because the balls are arranged at the diagonal or at an angle to the axis of the device, the plan view of Figure 2 would show a portion of all of the balls 18 from top to bottom of the device. However, for purposes of simplicity and illustration, only the top course or circle of balls 18 and one of the longitudinal rows of balls are shown. It is to be noted that both Figures 1 and 2 disclose the arrangement of the balls in both a transverse and longitudinal plane.

For the purpose of retaining the bearing device on the free end of the shaft, pin or rod, such as, for example, the rod 24 of the die set shown in Figure 5, the intermediate course or circle of balls is resiliently and yieldably urged radially inward of the device to engage in an annular groove provided in the shaft or rod. The detail of the means for resiliently and yieldably urging the balls inward around the intermediate course or circle of balls is illustrated in Figures 1, 3, 4 and 6.

Positioned over the outer opening of each socket 14 of the intermediate circle or course of sockets, there is a spring member 19 which has a circular portion and a tongue portion 20 extending therefrom. This spring is made of spring steel and there is a warp or bend between the circular portion of the member 19 and the tongue portion 20, such as to resiliently press the ring portion of the member 19 radially inward over its respective socket to hold the members 19 in position.

The spring members 19 are held to the intermediate cage ring or retainer by means of a U-shaped strap 21, through the ends of which there are aligned holes 22. A rivet 23 extending through the aligned holes 22 firmly holds the ends of the strap 21 in position and firmly holds the strap 21 to the cage ring or retainer by embracing the adjoining portions of the members 11 and 12 of the intermediate cage ring.

The spring members 19 are mounted in pairs over two adjoining sockets and for this purpose one of the pairs of members is designated by the reference character 19 and the other of the pairs of spring members is designated by the reference character 19a. For this purpose, the tongue portion of the one spring member is designated by the reference character 20 and the tongue portion of the twin spring member 19a is designated by the reference character 20a. The tongue portions of each pair of spring members are placed one over the other in an overlapping arrangement and the strap member 21 embraces the overlapped tongue portions, holding them together and also holding them tightly to the intermediate cage ring or retainer. The firm hold of the strap 21 upon the overlapped tongue portions 20 and 20a and the resilient bias of the spring members 19 and 19a of each pair of spring members is such that the balls 18 over which the spring members are positioned are resiliently urged radially inward of the device.

The central round opening of each spring member is so proportioned to the diameter of the ball that the ball is urged radially inward of the device in its socket, although the ball is still exposed for bearing engagement in the bore of a housing. There is thus provided a mechanism for yieldably urging one of the courses or circles of balls in the device radially inward so as to engage and yieldably hold the device on a shaft, rod or pin.

To show a typical and useful application of my invention, I illustrate in Figure 5 a die set having an upper plate 27 and a lower plate 28. Secured to and extending downwardly from the upper plate 27, there are two spaced rods, shafts or pins 24 in parallel relationship. Secured to and extending upwardly from the lower plate 28, there are two cylindrical housings or casings 26 in parallel relationship and axially aligned with respective rods 24. Each of the housings 26 has a cylindrical bore adapted to accommodate a rod or pin 24. The bore of each housing 26 is substantially larger than the diameter of its respective mating rod or pin 24 so as to provide space for ball bearings between the inner wall of the bore of the housing and the outer cylindrical surface of the rod. It is within this cylindrical-shaped space within the housing 26 and around the rod 24 that my bearing device fits and is used to provide a good bearing engagement intermediate the rod 24 and housing 26. The play between the internal wall of the housing 26 and the rod 24 is such that the balls 18 may revolve in the usual manner and at the same time proper guidance and alignment is provided for the rod 24 relative to the housing 26.

It is desired in this and other uses and applications that the bearing device be so retained upon the rod or pin as to cling thereto and not fall off when the rod or pin 24 is raised and the bearing device is otherwise unsupported. To provide for this, formed on the rod or pin 24 near the lower end thereof is an annular groove 25. This annular groove 25 is rather shallow and has a rounded bottom wall, as shown in Figure 5, which complements the spherical surface of the balls 18. The arrangement is such that the intermediate course or circle of balls 18 resiliently pressed radially inward by the several spring members 19 are urged into the groove 25 and this tends to hold the whole bearing device upon the rod or pin 24. However, the resilient grasp of the inwardly pressed balls may be overcome by forcibly pulling the entire bearing device axially downward along the rod 24 and away from the top plate 27.

This is a convenient feature because it is often desired to quickly remove the entire bearing devices from the rods 24, such as when there is a grinding operation nearby on the die set and it is necessary to protect the balls from dust or foreign particles. It is also desirable and convenient to have this arrangement so that the bearing devices may be readily mounted upon the rods 24 and held in position prior to the insertion of the rods 24 within the housings 26. The necessity for cross-pins or bolts of a permanent nature for holding the bearing device to its respective rod is obviated. Those who are acquainted with devices of this nature and of the problems and conditions relating to bearing devices interposed between a shaft, rod or pin and a housing or casing will readily appreciate and recognize the distinct advantages and benefits that accrue from this invention.

It is to be noted, of course, that my invention may be utilized in arrangements wherein there is rotary movement between a shaft or rod and the housing or casing, accommodating the shaft or rod, as well as arrangements where there is reciprocal movement, as illustrated in Figure 5. The bearing device may also be utilized where there is both rotative movement and longitudinal movement between the respective shaft, rod or pin and the housing or casing in which the rod, shaft or pin is inserted.

Figure 7:
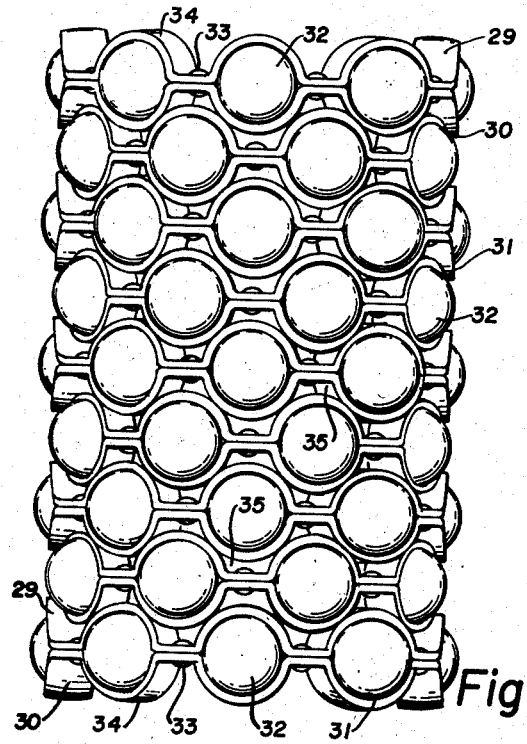
Figure 7 is a side view of a modified form of bearing device.
Figure 8:
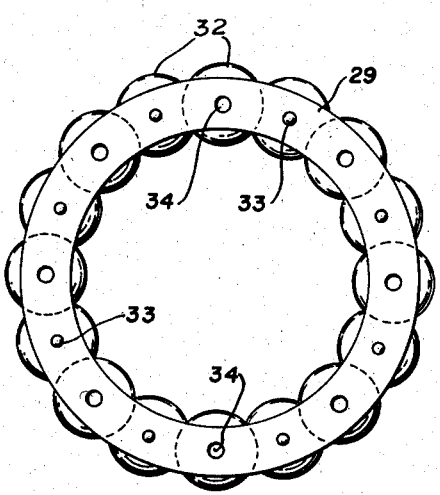
Figure 8 is a plan view of the modified device shown in Figure 7.
Figure 9:
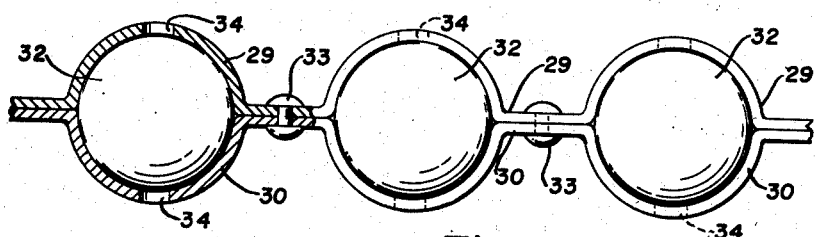
Figure 9 is an enlarged view partially in section of a portion of the device shown in Figure 7.
Figure 10:
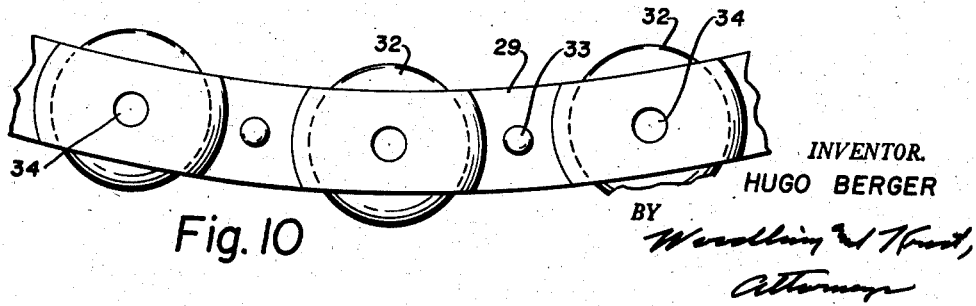
Figure 10 is a plan view of the portion of the device shown in Figure 9.

In the modified form of my invention shown in Figures 7, 8, 9 and 10, the cage rings or retainers are positioned in the staggered relationship shown in Figure 7. Each ball separator or cage ring or retainer is composed of an upper half 29 and a lower half 30, the two elements 29 and 30 being connected together by rivets 33. The form of the elements 29 and 30 is such as to leave the ball sockets 31. Each ball socket 31 has an inner wall of convex shape complementary to the spherical form of its respective ball and is arranged to retain the ball within the socket while exposing the ball radially inward and outward for bearing engagement. The balls 32, while retained within the ball sockets, are exposed to engage the shaft and the inner wall of the housing in which the shaft is inserted. It is noted that in this arrangement, too, there are open spaces 35 between the several sockets so as to provide a passageway and storage space for lubricant. Also, there are holes or apertures 34 in the elements 29 and 30 at the opposite axial ends of each socket 31. By the combination of the open spaces provided by the network of the arrangement of the cage rings or retainers and by the holes 34, there is provided a proper flow and supply of lubricant for the balls 32 in their respective sockets.

Another modified form of my device is illustrated in Figures 11 to 18, inclusive. A side view of this modified form of device is shown in Figure 11. In this last modified form of my device, the cage rings or ball retainers are made of a plurality of rings having a U-shaped cross-section. Each U-shaped ring has an upper arm 36, a base portion 37 and a bottom portion 38. The base portion 37 extends parallel to the axis of the device and the arm portions 36 and 38 extend radially outward therefrom. There is provided a slight concavity 44 in the ring portions at intervals around the circumference of the device by a slight deforming of the upper arm 36 and lower arm 38 of each retainer. Also holes or openings 43 are provided in the wall or base portion 37 so as to expose the radially innermost portion of the balls 42 for engagement with a shaft or rod. By means of this slight deforming of the portions 36 and 38 and by the respective openings 43, there are provided sockets for the retention of balls 42 in the relative positions shown in Figures 11 and 15.

The concavities 44 formed in the upper and lower arms 36 and 38 are better seen in the enlarged views of Figures 19 and 20. As seen in these views, the concavities 44 form pairs of opposed "cups" which receive and retain between them the several balls 42, respectively. Aligned openings or apertures 45 in the members 36 and 38 at the centers of the concavities 44 provide axially extending passageways for lubricant to pass or flow through the members 36 and 38 directly from one ball to other balls above and below it. There are thus provided in the ball retainers lubrication openings extending longitudinally of the retainers at the location of the ball-bearing sockets.

To interconnect the stacked cage rings, there is provided in the bottom portion 38 a tongue 39 and there is provided in the portion 36 of each ring a slot 40. The tongues 39 are moved in and through the respective slots 40 and bent radially outward, as shown in detail in Figure 14. This provides an interlocking between adjoining cage rings and thus provides a unitary structure, as shown in Figure 11, of the five cage rings superimposed in axial alignment. Interengaging tongues 39 and slots 40 are positioned at intervals around the circumferential extent of the bearing device.

There is also provided an aligning rod 41 extending down through the several cage rings and secured thereto so as to provide rigidity and strength to the entire structure. It is to be noted that the structure provided in this modified arrangement of Figure 11 leaves open spaces intermediate the balls, in which open spaces lubricant is stored and flows to assure ample and proper lubricant to the balls 42.

Figure 17:
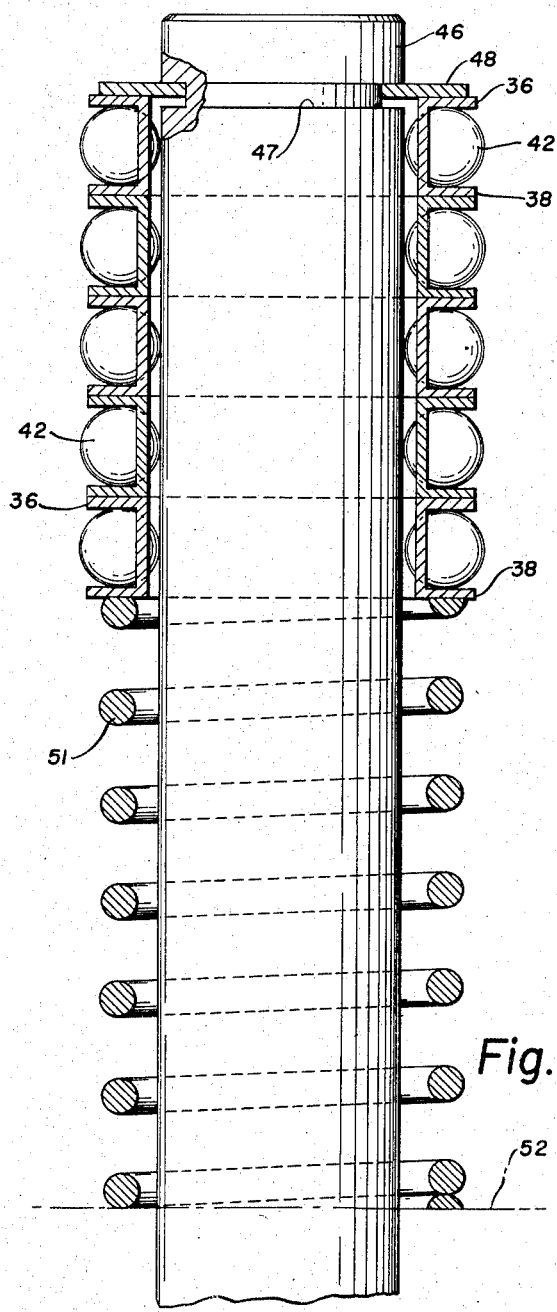
Figure 17 is a cross-sectional view of the modified form of device shown in Figure 11 mounted on a shaft and held thereto by the means shown.
Figure 18:
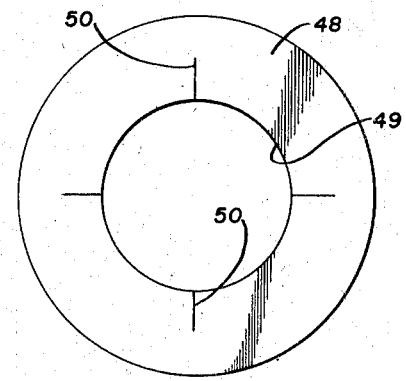
Figure 18 is a plan view of the resilient disc or spring washer mounted to the shaft of Figure 17 for holding the device in place.

An arrangement for mounting one of my bearing devices, for example the bearing device illustrated in Figures 7 and 11, is shown in Figure 17. In this mounting arrangement, the device is mounted on a shaft, rod or pin 46. For purposes of illustration, I show a device like the modified form of Figure 11 mounted upon the shaft 46 in Figure 17. Milled or otherwise formed in the shaft 46 near its free end is an annular groove 47. A retaining washer 48 of spring steel or other appropriate metal is provided to fit over the top of the bearing device, as shown in Figure 17. This retaining washer 48 has a central opening 49 slightly smaller than the maximum diameter of the shaft 46 and which is complementary to the diameter of the shaft 46 within the groove 47.

A plurality of slits or cuts 50 are provided in the washer 48 which extend radially outward from the central opening 49 but which do not reach the outer circumference of the washer 48. By means of these cuts, radially inward directed tongues are provided which resiliently give or yield to permit the washer to be pressed downwardly over the free end of the shaft 46. When the washer 48 reaches the location of the groove 47, then the tongues snap into the groove 47 and assume the position shown in Figure 17.

An expansion coil spring 51 is based upon a plate or other abutment 52 illustrated diagrammatically by the broken line in Figure 17. The bias of the spring 51 is such as to yieldably urge the bearing device upwardly in Figure 17 and thus against the retaining washer 48. By this means, the bearing device may be readily mounted and demounted from the shaft 46 as desired. The balls 42 held by the cage rings provide a bearing contact between the shaft 46 and the inner wall of a cylindrical bore in a housing in which the shaft 46 is inserted.

The invention in its various forms as shown and described herein provides a superior bearing device which is adapted for many uses and which provides improved results not heretofore obtainable.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A bearing device comprising a cage structure of cylindrical shape having ball sockets disposed both circumferentially and longitudinally of the structure, some of said ball sockets being positioned in a longitudinal direction intermediate of the ball sockets at the axial ends of the device, ball bearings mounted in said sockets and exposed both radially inward and radially outward of the structure for bearing engagement, said structure having intermediate said circumferentially arranged sockets open spaces for accommodating lubricant, said open spaces being distributed at spaced intervals both longitudinally and circumferentially of the structure to provide lubricant on opposite sides of intermediate sockets longitudinally of the device and of sockets around said structure.

2. A bearing device comprising a series of cage rings stacked and connected together with intermediate rings axially aligned with end rings, each ring being formed to retain ball bearings spaced apart around the circumference of the ring, a plurality of ball bearings of equal size held by the respective rings in said spaced positions, adjoining rings at the location of the retained balls having apertures for lubricant to pass between balls of said adjoining rings, the spacing of the ball bearings by intermediate rings of said series providing lubricant-accommodating open spaces in a direction longitudinally of said end rings.

3. A bearing device comprising a series of cage rings stacked and connected together with intermediate rings axially aligned with end rings, each ring being formed to retain ball bearings spaced apart around the circumference of the ring, a plurality of ball bearings of equal size held by the respective rings in said spaced positions, adjoining rings at the location of the retained balls having apertures for lubricant to pass between balls of said adjoining rings, and yieldable means for yieldably holding said device to a shaft inserted into the device, the spacing of the ball bearings by intermediate rings of said series providing lubricant-accommodating open spaces in a direction longitudinally of said end rings.

4. A bearing device comprising a series of balls and a retainer member for holding said balls arranged in a plurality of parallel circles, some of said circles being positioned intermediate of circles at the axial ends of the device, said retainer having sockets for the respective balls interspersed with open spaces between sockets to accommodate lubricant, the balls in said intermediate circles having some of said open spaces disposed in planes on opposite axial sides thereof, said sockets being arranged to permit limited radial movements of said balls and to expose the balls for inner and outer engagement, and biasing means for biasing some of said balls to move in one radial direction.

5. In combination, a rod or shaft, a housing for said rod or shaft, and a bearing device adapted to fit between said rod or shaft and the bore wall of said housing for the rod or shaft, said rod or shaft having an annular groove formed therein, said device comprising a plurality of balls, a plurality of cage rings arranged in parallel relationship for holding said balls both circumferentially and longitudinally of the device, said cage rings having open spaces at spaced intervals therearound for accommodating lubricant, said cage rings exposing said balls to engagement by said rod or shaft and said bore wall, and a plurality of spring members mounted to said device for resiliently urging balls carried by one of said cage rings radially inward to press into said groove and to yieldably grasp said rod or shaft.

6. A device comprising an open network of strips formed to provide spaced ball sockets open on opposite sides, said network having lubricant-accommodating open spaces interspersed with said sockets, said network being formed in cylindrical shape to position said sockets and open spaces both circumferentially and longitudinally of the axis of the cylindrical network, some of said sockets and open spaces being distributed longitudinally of the device intermediate of the sockets and open spaces at the axial ends of the device, and a plurality of balls of equal size positioned in said sockets and exposed on said open opposite sides, said balls having limited radial movement in the respective sockets, the said strips forming said sockets being apertured to provide access to said sockets for lubricant, balls in said intermediate sockets providing bearing-engaging surfaces longitudinally of the device intermediate of the bearing-engaging surfaces provided by the balls at the axial ends of the device.

7. In combination with a shaft having an annular groove formed in its outer cylindrical surface, said shaft being insertable in the bore of a housing, a bearing device comprising a ball-retaining member having ball sockets arranged in a series of circles of equal size to define a cylinder, a plurality of balls positioned in the respective sockets and exposed radially inward and outward of the ball-retaining member, certain balls in sockets of one of said circles having limited radial inward and outward movement, and spring means connected to the device pressing radially inward on said certain balls to yieldably urge the same into said groove upon disposition of said one circle in the plane of said groove to provide a yieldable grasp on said shaft.

8. A bearing device having ball sockets arranged in a plurality of parallel circles, balls held in the respective sockets, said sockets permitting limited radial movement of the balls and exposing the balls for engagement both radially inward and outward of the device, springs mounted on the device and engaging certain of said balls to yieldably urge them radially inward and maintaining the exposure of said certain balls for engagement radially outward of said device.

9. A cylindrically shaped bearing member having ball bearings arranged in parallel circular courses, a plurality of spring members carried by the member and arranged to resiliently urge radially inward ball bearings of one of said circular courses, said spring members straddling the respectively urged ball bearings to expose said balls for bearing engagement radially outward of the bearing member.

10. A cylindrically shaped bearing member having ball bearings arranged both longitudinally and circumferentially of said member, spring means carried by the member and arranged to resiliently urge at least one of said ball bearings radially, said spring means exposing said at least one of the ball bearings radially outward of the bearing member for bearing engagement.

11. A device adapted to be positioned in a cylindrical space between opposed cylindrical walls of relatively reciprocal and concentric members to bearingly guide the relative reciprocal motion therebetween, said device comprising an open network of material disposed substantially in a cylindrical form and disposed to provide a plurality of ball sockets arranged circumferentially and longitudinally of said cylindrical form, said network in cylindrical form having an axial length greater than the maximum radius thereof, said ball sockets being open both radially inward and radially outward of said cylindrical form, said network having lubricant-accommodating open spaces interspersed at a plurality of intervals with said sockets around and along said cylindrical form, said sockets being arranged spirally along said cylindrical form, and a plurality of balls each positioned in a respective socket and exposed for engagement both radially inward and radially outward of said cylindrical form, the spiral arrangement of said sockets providing for non-tracking of adjacent balls in longitudinally disposed sockets in movement of said balls in a path parallel to the axis of said cylindrical form, the sockets intermediate of the sockets at the axial ends of the device having open spaces disposed on opposite sides thereof in a longitudinal direction.

12. A cylindrically shaped bearing member having a plurality of ball bearings arranged both longitudinally of, and around, said member to provide bearing engagement both radially inward and radially outward of said bearing member at longitudinally spaced intervals along said member and around said member, said bearing member having open spaces positioned intermediate of adjacent of said ball bearings in a circumferential direction and extending to between adjacent of said ball bearings in a longitudinal direction, said open spaces extending on opposite sides in a longitudinal direction of the ball bearings intermediate of ball bearings at the axial ends of the member, said open spaces being adapted to accommodate lubricant and disposed to supply lubricant to adjacent of said ball bearings both from a direction extending circumferentially, and from a direction extending longitudinally of said member.

13. The combination of a shaft having a cylindrical outer wall, a housing for said shaft having a cylindrical inner wall spaced radially outward from, and concentric with, the outer wall of said shaft to define a straight-annular open space therebetween, one of said shaft and housing being reciprocal relative to the other, and a bearing device positioned in said open space, said bearing device comprising a series of superimposed interconnected cage rings and a plurality of ball bearings of equal diameter held by said cage rings, said ball bearings engaging both said inner and outer walls at a plurality of intervals axially extending along said walls to bearingly guide said reciprocal movement between the shaft and housing, said cage rings holding said ball bearings apart in an arrangement in which the ball bearings are disposed in a series of parallel circles along the common axis of said cylindrical outer and inner walls, said cage rings including circumferentially spaced sockets holding said ball bearings and having open spaces intermediate of the sockets holding adjacent ball bearings and within the radial dimensions of said rings to accommodate lubricant, some of said open spaces being positioned in a longitudinal direction intermediate of the cage rings at the axial ends of the device.

14. The combination of a shaft having a cylindrical outer wall, a housing for said shaft having a cylindrical inner wall spaced radially outward from, and concentric with, the outer wall of said shaft to define a straight-annular open space therebetween, one of said shaft and housing being movable relative to the other, and a bearing device positioned in said open space, said bearing device comprising an open network of strips formed to provide spaced ball sockets open on opposite radially spaced sides, said network having lubricant-accommodating open spaces interspersed with said sockets, said network being formed in a cylindrical shape to position said sockets and open spaces both circumferentially and longitudinally of the axis of the cylindrical network, some of said sockets and open spaces being distributed longitudinally of the device intermediate of the sockets and open spaces at the axial ends of the bearing device, and a plurality of balls of equal size positioned in said sockets and exposed on said opposite sides to simultaneously engage said inner and outer walls, said balls being retained in said sockets by the network of strips defining the sockets, balls in said intermediate sockets providing bearing engagement with said inner and outer walls longitudinally of the device intermediate of the bearing engagement provided by the balls in the sockets at the ends of the device.

15. In combination with relatively reciprocal and concentric members having opposed cylindrical walls defining a cylindrical space therebetween, a device positioned in said cylindrical space to bearingly guide the relative reciprocal movement between said concentric members, said device comprising a plurality of balls and a cylindrical retainer member for holding said balls arranged in a series of equal circles along the axis of said concentric members, the axial distance between the terminal circles of said series being greater than the radius of said circles, said retainer member having sockets for the respective balls interspersed circumferentially and longitudinally with open spaces between sockets to accommodate lubricant in said open spaces, balls intermediate of said terminal circles having open spaces disposed in a longitudinal direction on opposite sides thereof, said sockets being arranged to permit limited radial movement of said balls and to expose the balls for inner and outer engagement radially of said retainer member by said opposed cylindrical walls, said sockets being spirally arranged along the length of the retainer member to offset along the retainer member the centers of the balls in each said circle from the centers of the balls in an adjacent said circle.

16. In combination with relatively reciprocal and concentric members having opposed cylindrical walls defining a cylindrical space therebetween, a device positioned in said cylindrical space to bearingly guide the relative reciprocal movement between said concentric members, said device comprising a plurality of balls and a cylindrical retainer member for holding said balls around and along the common axis of said concentric members, said retainer member having an axial length greater than the radius thereof, said retainer member having sockets for the respective balls interspersed at intervals circumferentially and longitudinally of the device with open spaces between sockets around and along the retainer member to accommodate lubricant in said open spaces, said sockets being arranged to permit limited radial movement of said balls and to expose the balls for inner and outer engagement radially of said retainer by said opposed cylindrical walls, respectively, said sockets being offset from each other along the length of the said retainer member to dispose the balls lengthwise of said retainer member in courses non-parallel to the said common axis.

17. In combination with relatively reciprocal and concentric members having opposed cylindrical walls defining a cylindrical space therebetween, a device positioned in said cylindrical space to bearingly guide the relative reciprocal movement between said concentric members, said device comprising a series of superimposed interconnected cage rings and a plurality of bearings held by said cage rings, said rings holding said ball bearings apart in an arrangement in which the ball bearings are disposed in a series of circles along the common axis of said concentric members, the intermediate of said circles in said series having the same radius as the terminal circles of said series, said cage rings including circumferentially spaced sockets holding said ball bearings and having open spaces intermediate of said sockets arranged circumferentially of the device and within the radial dimensions of the rings to accommodate lubricant in said open spaces, ball bearings in said intermediate of said circles having open spaces disposed on opposite sides thereof in a longitudinal direction, said sockets and open spaces being offset from each other in a longitudinal direction along said device to provide that said ball bearings are not aligned with immediately adjacent ball bearings disposed in straight lines parallel to said common axis.

18. In combination with a rod and a housing having a bore accommodating said rod, a device positioned in said bore and providing a bearing between said rod and housing upon relative axial movement between the rod and housing, said device comprising an open network of material extending in a generally radial direction to form substantially a cylinder having an axis coinciding with the axis of said rod, said network being open to provide ball sockets open radially inward and outward of said cylinder and to provide lubricant-accommodating open spaces interspersed with said sockets, said sockets and open spaces being disposed in alternate arrangement in respect to each other both circumferentially and longitudinally of said cylinder, said open spaces offset from said sockets along longitudinal lines parallel to the axis of said cylinder, the sockets intermediate of the sockets at the axial ends of the cylinder having open spaces disposed on opposite sides thereof in a longitudinal direction, and a plurality of balls each positioned in a respective socket and bearingly engaging said rod and said housing accommodating said rod, said offset open spaces providing for the following of a ball with lubricant accommodated in the open space offset from the socket holding the respective ball upon movement of said respective ball in a path parallel to said axis.

19. In combination with relatively reciprocal and concentric members having opposed cylindrical walls defining a cylindrical open space therebetween, a device positioned in said cylindrical space to bearingly guide the relative reciprocal movement between said concentric members, said device having ball sockets arranged in a series of parallel and equal circles disposed along the common axis of said concentric members and concentric therewith, the distance between the terminal circles of said series being greater than the radius thereof, said device having open spaces interspersed at uniformly spaced intervals with said sockets and also arranged in a series of parallel and equal circles disposed along said common axis, balls disposed in said sockets, said sockets permitting limited radial movement of the balls and exposing the balls for engagement both radially inward and outward of the device, sockets intermediate of the sockets at the axial ends of the device having open spaces on opposite sides thereof in a longitudinal direction, said open spaces providing for the accommodation of lubricant and the supply of said lubricant to balls in sockets adjacent each said open space upon axially directed movement of said device to roll said balls.

20. In combination with relatively reciprocal and concentric members having opposed cylindrical walls defining a cylindrical open space therebetween, a device positioned in said cylindrical space to bearingly guide the relative reciprocal movement between said concentric members, said device having ball sockets arranged in a series of parallel and equal circles disposed along the common axis of said concentric members and concentric therewith, the distance between terminal circles of said series being greater than the radius thereof, balls disposed in said sockets, respectively, said device being open intermediate of adjacent sockets circumferentially and longitudinally of said device to accommodate lubricant and to supply same to balls in said adjacent sockets, each of said open spaces being extended to locations intermediate of adjacent of said disposed sockets longitudinally of said device to supply lubricant to balls in said adjacent sockets movable in straight paths parallel to the axis of said device, sockets intermediate of the sockets at the axial ends of the device having open spaces on opposite sides thereof in a longitudinal direction.

21. The combination as set forth in claim 13 and in which the superimposed interconnected cage rings of the bearing device are each of U-shape cross-section and circular in form with the arms of the U extending radially outward.

22. The combination as set forth in claim 21, and yieldable means carried by the bearing device for yieldably holding said bearing device to a said shaft inserted into the bearing device and disposed along the axis thereof.

23. The combination as set forth in claim 22, and in which said cage rings have lubrication openings extending therethrough in a longitudinal direction at the location of said sockets.

References Cited in the file of this patent

UNITED STATES PATENTS

| | | |
|---|---|---|
| 644,608 | Keller | Mar. 6, 1900 |
| 1,228,312 | Garnier | May 29, 1917 |
| 1,427,225 | Mueller | Aug. 29, 1922 |
| 2,422,774 | Conner | June 24, 1947 |
| 2,448,688 | Scheiwer | Sept. 7, 1948 |

FOREIGN PATENTS

| | | |
|---|---|---|
| 116,886 | Sweden | July 23, 1946 |
| 1,002,720 | France | Nov. 7, 1951 |